United States Patent

Uemura

[15] 3,652,927
[45] Mar. 28, 1972

[54] VECTOR DISPLACEMENT DEVICE
[72] Inventor: Saburo Uemura, Yokohama, Japan
[73] Assignee: Sony Corporation, Tokyo, Japan
[22] Filed: Mar. 24, 1970
[21] Appl. No.: 22,280

[30] Foreign Application Priority Data
    Apr. 9, 1969    Japan.................................44/27883

[52] U.S. Cl. .........................................324/34 D
[51] Int. Cl.........................................G01r 33/00
[58] Field of Search..................335/209, 219, 222, 227, 229,
        335/234, 246, 268, 266, 284, 287, 288, 290, 306;
        336/132, 134, 135; 324/34 PS; 33/204.66; 318/653

[56] References Cited

UNITED STATES PATENTS

| | | | |
|---|---|---|---|
| 2,905,874 | 9/1959 | Kelling | 324/34 P |
| 1,988,458 | 1/1935 | Minorsky | 33/204.66 |
| 2,484,022 | 10/1949 | Esval | 336/135 X |
| 2,774,057 | 12/1956 | Jones | 336/135 X |

Primary Examiner—G. Harris
Attorney—Lewis H. Eslinger, Alvin Sinderbrand and Curtis, Morris and Safford

[57] ABSTRACT

A device for detecting relative displacements of two members in first and second right-angularly related directions has first and second dual-gap magnetic flux responsive heads fixed relative to one of said members with the directions across the gaps of the first and second heads being respectively parallel to the first and second directions of relative displacement, first and second magnets fixed relative to the other member and being disposed adjacent the first and second heads with each magnet being magnetized in the direction across the gaps of the adjacent head, and circuits connected with the heads to provide electrical outputs that are characteristic of the magnetic flux received by the respective heads from the adjacent magnets and hence correspond in magnitude and polarity to relative displacements of the members in the first and second directions from a predetermined position.

5 Claims, 10 Drawing Figures

PATENTED MAR 28 1972　3,652,927

INVENTOR
SABURO UEMURA
BY
*Lewis H. Eslinger*
ATTORNEY 3,652,927

1

VECTOR DISPLACEMENT DEVICE

This invention relates generally to vector displacement detectors, that is, to devices for vectorially detecting or measuring the relative displacements of two members.

It is frequently desirable to detect or measure complex relative movements of two members, for example, movements of a movable machine element with respect to the stationary supporting frame therefor. Further, it is desirable that such detection or measurement be effected vectorially, that is, by measuring or detecting displacements in angularly related directions to provide vectors that together represent the direction and distance of the relative movement. Such vectorial detection or measurement of relative movements may be employed, for example, in controlling the operations of automated machines and the like.

It is an object of this invention to provide devices for vectorially detecting complex relative movement of two members in an accurate manner.

Another object is to provide devices, as aforesaid, which employ magnetic flux responsive heads to produce electrical outputs that correspond to the vectors of the relative movement.

Still another object is to provide devices, as aforesaid, in which the electrical output characteristic of one vector is not influenced by changes in the other vector.

In accordance with an aspect of this invention, relative displacement of two members in first and second directions lying in right-angularly related planes is detected by providing first and second dual-gap magnetic flux responsive heads fixed relative to one of the members so that the directions across the gaps of the first and second heads are parallel to the first and second directions, respectively, of the relative displacement, and first and second magnets fixed relative to the other member adjacent the first and second heads, respectively, with each of the magnets being magnetized in the direction across the gaps of the respective head so that the magnetic flux received from the adjacent magnet by each head is altered only in response to relative displacement of the members in the direction extending across the gaps of such head.

The above, and other objects, features and advantages of this invention, will be apparent in the following detailed description of illustrative embodiments thereof which is to be read in connection with the accompanying drawings, wherein.

2

Figure 10:
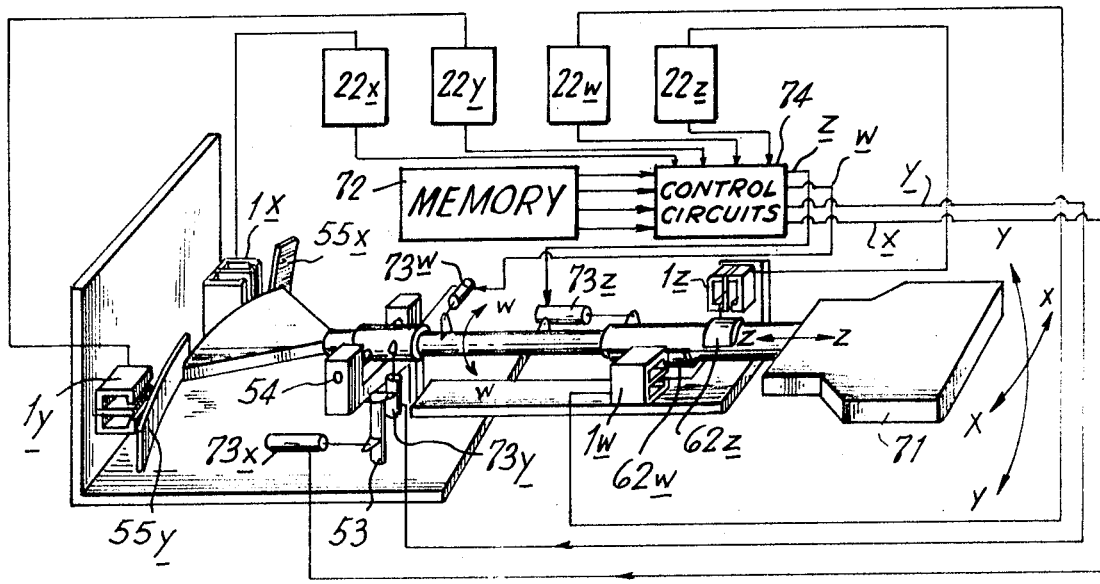
Figure 9:
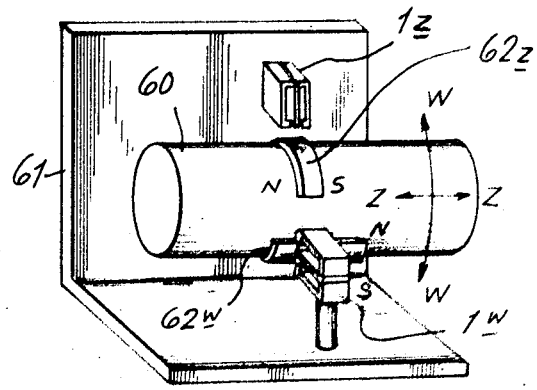

FIG. 9 is a schematic perspective view of a device according to still another embodiment of the invention for use with members which are relatively rotatable and also rectilinearly movable along the axis of relative rotation; and FIG. 10 is a schematic perspective view of a control system in which vectorial displacement detecting devices according to this invention may be employed.

Figure 1:
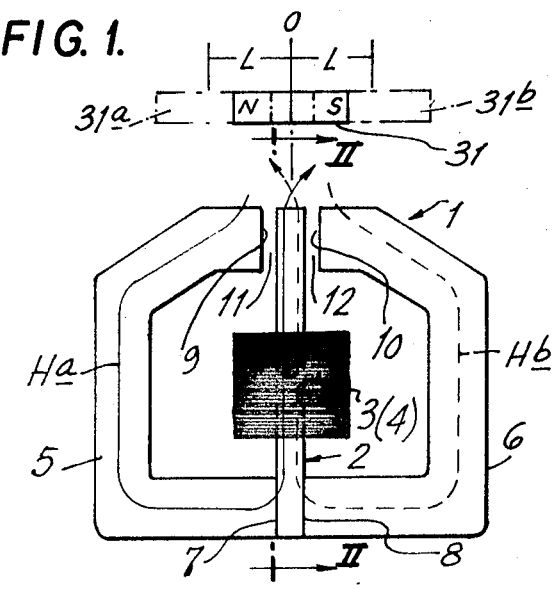
FIG. 1 is a schematic elevational view showing a dual-gap magnetic flux responsive head of a type that may be used in vector displacement detecting devices according to this invention, and which is shown in proximity to a magnetic flux generating source.
Figure 2:
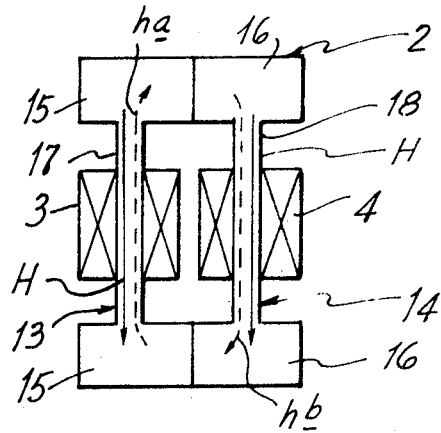
FIG. 2 is a sectional view taken along the line II—II on FIG. 1.

Referring to the drawings in detail, and initially to FIGS. 1 and 2 thereof, it will be seen that a differential-type or dual-gap magnetic flux-responsive head 1 that may be employed in a displacement detector according to this invention generally comprises a saturable magnetic core 2 having two coils 3 and 4 thereon, and a pair of magnetic yokes 5 and 6. As shown, yokes 5 and 6 are of U-shaped configuration and arranged in opposing relation with core 2 therebetween so that ends 7 and 8 of yokes 5 and 6 abut, and are suitably secured to opposite sides of one end portion of core 2, while the other ends 9 and 10 of yokes 5 and 6 are adjacent to the other end portion of core 2, but spaced therefrom to define the gaps 11 and 12 therebetween. Although the gaps 11 and 12 are generally referred to as "air-gaps," it is apparent that a non-magnetic material, such as, a non-magnetic alloy of copper and beryllium or a suitable plastic resin, may fill each of the gaps 11 and 12 to provide the structural rigidity for maintaining the desired gap width.

As shown particularly on FIG. 2, in a conventional construction of the core 2, the latter is constituted by one-piece core members 13 and 14 for the coils 3 and 4, respectively, with core members 13 and 14 including relatively wide end portions 15 and 16 and relatively narrow legs 17 and 18 extending between such wide end portions and having the coils 3 and 4 respectively wound thereon.

Figure 3:
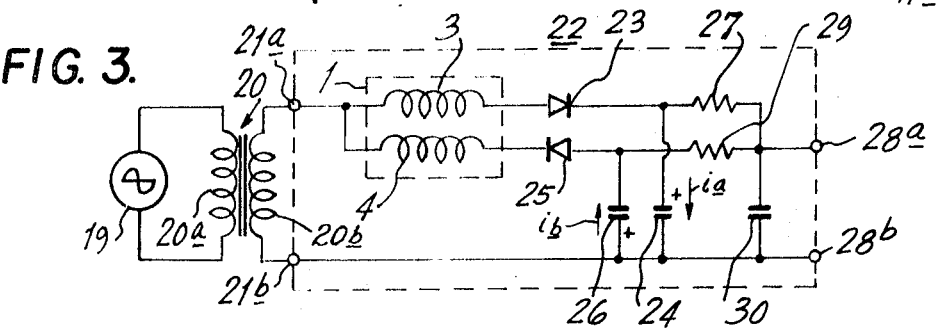
FIG. 3 is a wiring diagram showing a detecting circuit that may be used in association with the head of FIG. 1 to provide an output voltage characteristic of the magnetic flux received by the head from the source thereof.

As shown on FIG. 3, a magnetic field detecting circuit 22 for use with the head 1 has terminals 21a and 21b connected with the opposite ends of the secondary winding 20b of a transformer 20 having its primary winding 20a receiving the output of an AC generator or oscillator 19. Within circuit 22, coils 3 and 4 are connected in parallel to terminal 21a. Further, coil 3 is connected in series with a diode 23 and a condenser 24 to terminal 21b, and, similarly, soil 4 is connected in series with a diode 25 and a condenser 26 to terminal 21b, but with diodes 23 and 25 being conductive in opposite directions. Further, as shown, resistors 27 and 29 are connected between an output terminal 28a and junctions intermediate diode 23 and condenser 24 and intermediate diode 25 and condenser 26, respectively. The other output terminal 28b of circuit 22 is connected to junctions between condensers 24 and 26 and terminal 21b, and a DC current blocking condenser 30 is connected across terminals 28a and 28 b.

With the circuit 22 as described, the current $i_a$ flows through coil 3, diode 23 and condenser 24 during one-half of the cycle of oscillator 19 and the current $i_b$ flows in the opposite direction through condenser 26, diode 25 and coil 4 during the other half of the cycle, and the oscillator has a sufficiently high frequency, for example, 100 kHz., in relation to the time constant of the circuit, to maintain the voltages impressed on condensers 24 and 26 in correspondence with the currents $i_a$ and $i_b$, respectively.

When the head 1 is not influenced by a magnetic field, the currents $i_a$ and $i_b$ are equal, and therefore condensers 24 and 26 are equally charged with the result that no DC voltage appears across output terminals 28a and 28b. However, when head 1 is influenced by a magnetic field so that a direct magnetic flux is directed through core 2, for example, as indicated by the arrows H on FIG. 2, the conditions for saturation of legs 17 and 18 of core members 13 and 14 become different by reason of the fact that the fluxes, indicated by the arrows $h_a$ and $h_b$, produced by the currents $i_a$ and $i_b$ flowing through coils 3 and 4 are in opposite directions to respectively oppose and augment the direct magnetic flux H. Therefore, the coils 3 and 4 are made to have different inductances and the maximum values of currents $i_a$ and $i_b$ are accordingly different to charge condensers 24 and 26 with different voltages. The voltage difference between the charges on condensers 24 and 26 is proportionate to the direct magnetic flux H from the external source and appears as a direct voltage across output terminals 28a and 28b. Thus, the value and direction of the direct magnetic flux from an external source can be determined by measuring the magnitude and polarity of the voltage between terminals 28a and 28b.

Referring now to FIG. 1, it will be seen that, when the external magnetic source 31, for example, in the form of a permanent magnet as shown, is magnetized in the direction across gaps 11 and 12 and is disposed so that its center is aligned with the center of head 1, the fluxes Ha and Hb which respectively pass through yoke 5 and core 2 and through core 2 and yoke 6 cancel each other within core 2, and thus there is no resultant direct magnetic flux in core 2 so that no output appears at terminals 28a and 28b. However, as the magnetic flux source 31 is displaced from the centered position relative to head 1 in the direction parallel to its magnetization, for example, to the left as viewed on FIG. 1, the magnetic flux Ha becomes larger than the magnetic flux Hb to provide a DC voltage at output terminals 28a and 28b, which voltage reaches a maximum when source 31 attains the position indicated in broken lines at 31a on FIG. 1 where its center has been displaced the distance L from the center of head 1. As shown on FIG. 4, in which the displacement of the center of source 31 relative to the center of head 1 is plotted as the abscissas and the voltage at terminals 28a and 28b is plotted as the ordinates, the voltage output +V decreases with displacement of source 31 to the left beyond the distance L. Also, as shown on FIG. 4, when source 31 is displaced toward the right, as viewed on FIG. 1, from its centered position with respect to head 1, a voltage −V appears at terminals 28a and 28b, but with an opposite polarity to that of the voltage appearing as a result of the displacement to the left, by reason of the fact that the magnetic flux Hb becomes larger than the flux Ha. Once again the voltage −V is maximum when the displacement toward the right attains the distance L and is reduced by further displacement, as shown on FIG. 4.

Figure 4:
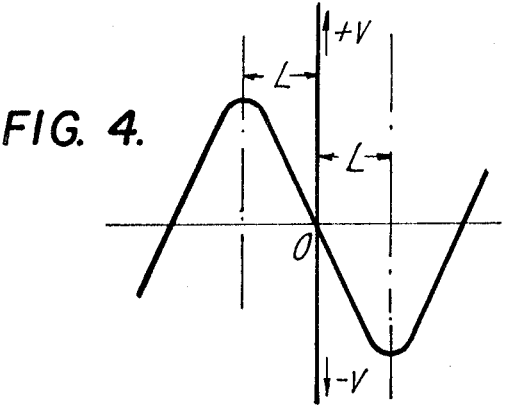
FIG. 4 is a graph showing the output voltage derived from the circuit of FIG. 3 when the head and source are displaced relative to each other as illustrated on FIG. 1.
Figure 5:
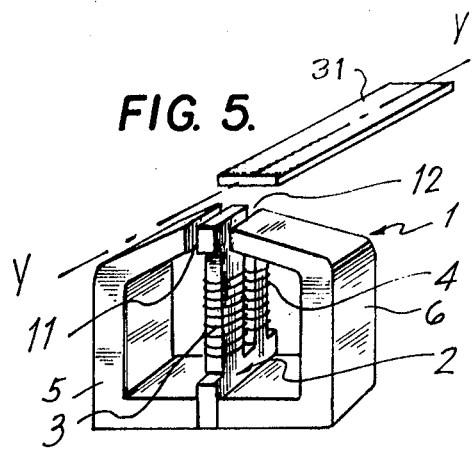
FIG. 5 is a perspective view of the head shown on FIG. 1 and a magnetic flux generating source which is elongated in the direction at right angles to the direction of its magnetization.
Figure 6:
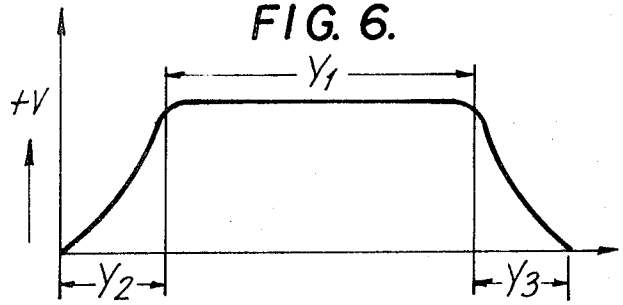
FIG. 6 is a graph illustrating the relationship of the voltage output to the relative displacement of the head and source of FIG. 5 when such relative displacement is in the direction of the longitudinal axis of the source.

Referring now to FIG. 5, it will be seen that, if the magnetic flux source 31 is of substantial length in the direction at right angles to its magnetization, for example, source 31 is in the form of an elongated strip magnetized transversely, as shown, then longitudinal displacement of source 31 in the direction of the axis Y—Y on FIG. 5, that is, in the direction at right angles to the width of gaps 11 and 12, will not change the voltage output at terminals 28a and 28b so long as a portion of the strip source 31 remains proximate to the head. Thus, if strip source 31 on FIG. 5 is laterally centered with respect to head 1 to provide no voltage output, longitudinal displacement of strip source 31 will not alter that zero output. Similarly, if strip source 31 is laterally displaced from its centered position with respect to head 1, for example to the position 31a on FIG. 1 so as to provide a maximum voltage output, as described with reference to FIGS. 1 and 4, that maximum voltage output will be maintained without change during displacement of strip source 31 in the direction of the axis Y—Y (FIG. 5) over the distance $Y_1$ (FIG. 6) which corresponds to the length of strip source 31. With further displacements of strip source 31 in the direction Y—Y, the voltage output will be progressively reduced to zero over the distances $Y_2$ (FIG. 6) which are equivalent to the dimension of head 1 in the direction Y—Y.

Figure 7:
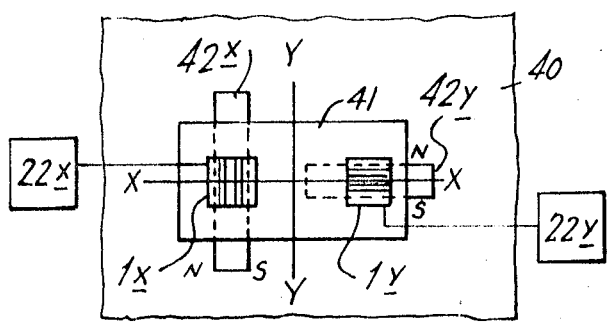
FIG. 7 is a schematic plan view of a device according to this invention for detecting relative displacement in directions at right angles to each other of two members which are relatively movable in parallel planes.

Referring now to FIG. 7, it will be seen that a vectorial displacement detecting device according to this invention is there shown for use with members 40 and 41 which are relatively displaceable in right-angularly related directions X—X and Y—Y while remaining parallel with each other. For example, member 40 may constitute the base of a machine tool of which member 41 is a work supporting table movable in the directions X—X and Y—Y. It will be apparent that the directions X—X and Y—Y are contained in right-angularly related planes which are in turn normal to the plane of member 40. The device according to this invention is shown to generally comprise dual-gap magnetic flux responsive heads 1x and 1y, each of which may be of the type described above with reference to FIGS. 1 and 2, detecting circuits 22x and 22y respectively connected with heads 1x and 1y and each of which may be of the type described above with reference to FIG. 3, and magnets 42x and 42y which are associated with the heads 1x and 1y, respectively.

As shown, heads 1x and 1y may be fixed relative to member 41, while magnets 42x and 42y are fixed relative to member 40 so as to be located adjacent heads 1x and 1y, respectively. Thus, the relative displacement of members 40 and 41 in the direction X—X and/or the direction Y—Y will cause corresponding relative displacement of head 1x and magnet 42x and of head 1y and magnet 42y.

In accordance with this invention, head 1x is positioned so that the direction across its gaps is parallel to the direction X—X of relative displacement, and magnet 42x has its direction of magnetization extending across the gaps of head 1x. Further, magnet 42x is preferably elongated in the direction parallel to the direction Y—Y of relative displacement. Similarly, as shown, head 1y is positioned so that the direction across its gaps is parallel to the direction Y—Y of relative displacement, and magnet 42y has its direction of magnetization extending across the gaps of head 1y. Magnet 42y is also preferably elongated in the direction parallel to the direction X—X of relative displacement.

With the arrangement as described above and shown on FIG. 7, detecting circuits 22x and 22y will have zero voltage outputs when members 40 and 41 are at a datum position (as shown) relative to each other, that is, when the relative position of members 40 and 41 centers magnet 42x relative to head 1x in the direction X—X and centers magnet 42y relative to head 1y in the direction Y—Y, as will be apparent from the above discussion of the operation of head 1 with reference to FIGS. 1, 3 and 4. However, when members 40 and 41 are relatively displaced in the direction X—X from such datum position, magnet 42x will no longer be centered with respect to head 1x with the result that the associated circuit 22x will provide a voltage at its output which corresponds in magnitude to the distance of such relative displacement in the direction X—X. Further, the polarity of the voltage output from circuit 22x will indicate the direction of the relative displacement parallel to X—X. It is also to be noted that the relative displacement in the direction X—X does not alter the position of magnet 42y relative to head 1y in the direction Y—Y across the gaps of the latter head. Thus, as explained above with reference to FIGS. 5 and 6, the relative displacement in the direction X—X does not change the voltage output from the circuit 22y associated with head 1y.

Similarly, relative displacement of members 40 and 41 in the direction Y—Y from the datum position will result in a voltage output from circuit 22y which corresponds, in magnitude and polarity, to the extent of such displacement and the direction thereof. Further, as before, the relative displacement in the direction Y—Y will not alter the voltage output from the circuit 22x associated with head 1x. Thus, heads 1x and 1y and the associated circuits 22x and 22y, respectively, independently detect the relative displacements of members 40 and 41 in the directions X—X and Y—Y, respectively. Of course, if the relative displacement of members 40 and 41 is in the direction that is angularly related to directions X—X and Y—Y, then the outputs of circuits 22x and 22y will respectively correspond to the vectors of such displacement.

Although the device of FIG. 7 is adapted to vectorially detect the relative displacements of members 40 and 41 in right-angularly related directions which are parallel to the plane of the relative movement of members 40 and 41, devices according to this invention may be provided to vectorially detect other kinds of relative displacements, such as, universal pivotal displacements or combined rectilinear and rotary displacements.

Figure 8:
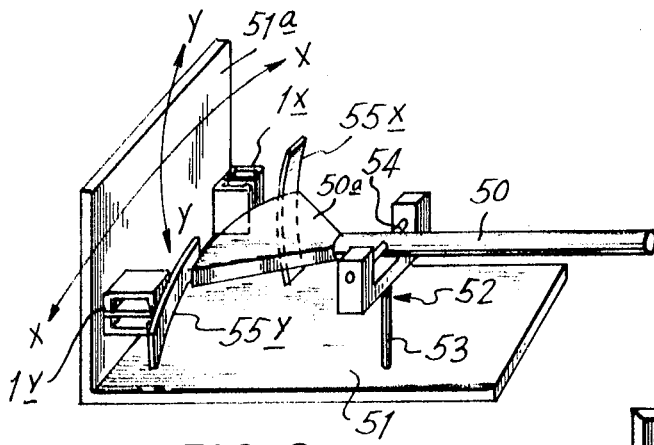
FIG. 8 is a schematic perspective view of a device according to another embodiment of this invention for use in connection with members capable of universal pivoting movement relative to each other.

For example, as shown on FIG. 8, the two relatively movable members 50 and 51 may have a universal pivotal connection 52 therebetween to permit their relative pivotal displacement in the direction X—X about the axis 53 and their relative pivotal displacement in the direction Y—Y about the axis 54. It will be seen that the directions X—X and Y—Y of relative displacement lie in right-angularly related planes, for example, in horizontal and vertical planes, respectively. In accordance with this invention, the device for vectorially detecting the relative pivotal displacement of members 50 and 51 in the directions X—X and Y—Y includes heads 1x and 1y which are fixed relative to member 51, for example, mounted on the portion 51a of member 51, and which are arranged so that the direction across the gaps of head 1x is parallel to the direction X—X and the direction across the gaps of head 1y is parallel to the direction Y—Y. Fixed relative to member 50, for example, mounted on the portion 50a of member 50, are magnets 55x and 55y which are disposed adjacent heads 1x and 1y and magnetized so that the directions of magnetization of magnets 55x and 55y extend across the gaps of heads 1x and 1y, respectively. Further, magnets 55x and 55y are preferably elongated in the directions Y—Y and X—X, respectively, and also preferably arcuate, as shown, with the curvatures of magnets 55x and 55y being centered in axes 54 and 53, respectively, so that the spacing between head 1x and magnet 55x and between head 1y and magnet 55y will not change in response to the relative pivotal movements of members 50 and 51.

It will be apparent that, when magnet 55x is centered relative to head 1x in the direction X—X and magnet 55y is centered relative to head 1y in the direction Y—Y, as when members 50 and 51 are in a datum position relative to each other, detecting circuits (not shown) associated with heads 1x and 1y, and which may be similar to the circuit 22 of FIG. 3, will provide zero output voltages. However, upon relative pivotal displacement of members 50 and 51 in the X—X direction from such datum position, the detecting circuit associated with head 1x will provide a voltage output corresponding in magnitude and polarity to the extent and direction of such displacement, while the voltage output from the circuit associated with head 1y will be unaffected. Conversely, upon relative pivotal displacement of members 50 and 51 in the direction Y—Y from the datum position, the detecting circuit associated with head 1y will provide a voltage output corresponding in magnitude and polarity to the extent and direction of such displacement, while the voltage output from the circuit associated with head 1x will be unaffected. Of course, when the relative pivotal displacement of members 50 and 51 has components in the X—X and Y—Y directions, respectively, the outputs from the detecting circuits associated with heads 1x and 1y will respectively indicate the vectors in the directions X—X and Y—Y of such relative pivotal displacement.

Although heads 1x and 1y have been shown on FIG. 8 to be fixed to portion 51a of member 51 while magnets 55x and 55y are fixed to the portion 50a of member 50, these positions can be reversed, that is, magnets 55x and 55y may be fixed to member 51 while heads 1x and 1y are fixed to member 50.

Referring now to FIG. 9, it will be seen that a device according to this invention may be employed to vectorially detect the relative displacements of members 60 and 61, shown in the form of a shaft and a support frame therefor, which are relatively displaceable in the direction W—W, for example by rotation of shaft 60 about its axis, and in the direction Z—Z, for example, by rectilinear displacement of shaft 60 parallel to its axis. In accordance with this invention, displacements in the direction W—W are detected by a dual-gap magnetic flux responsive head 1w mounted on member 61 with the direction across its gaps being parallel to direction W—W, and a magnet 62w mounted on member 60 and being magnetized in the direction across the gaps of the adjacent head 1w and elongated in the direction Z—Z. Displacements in the direction Z—Z are detected by a dual-gap magnetic flux responsive head 1z mounted on member 61 with the direction across its gaps being parallel to the direction Z—Z, and a magnet 62z mounted on member 60 and being magnetized in the direction across the gaps of the adjacent head 1z and elongated in the direction W—W. Further, magnet 62z is preferably longitudinally arcuate, as shown, with the curvature thereof being centered in the axis of member 60 about which the displacements W—W occur.

As in the previously described embodiments, the outputs of detecting circuits (not shown) connected with heads 1z and 1w will independently indicate the extent and direction of relative displacements of members 60 and 61 in the directions Z—Z and W—W, respectively, from a datum position where magnets 62z and 62w are centered relative to heads 1z and 1w.

As shown on FIG. 10, vectorial displacement detecting devices according to this invention may find advantageous application in industrial robot 70 comprising a movable support 71, for example, which may be used to carry an article, and which is intended to be moved according to a desired program, for example, as stored in a memory unit 72. The support 71 may be movably mounted, as shown, for swinging movements in the directions X—X and Y—Y about the axes 53 and 54, respectively, in the manner described with reference to FIG. 8, and for rotary movements in the direction W—W are rectilinear movements in the direction Z—Z, for example, as described in connection with FIG. 9. Electrically controlled actuators 73x, 73y, 73w and 73z are provided to effect the movements in the directions X—X, Y—Y, W—W and Z—Z, respectively, and are controlled by signals x, y, w and z received from suitable control circuits 74.

In order to detect the positions of support 71 in the directions X—X and Y—Y, heads 1x and 1y and associated magnets 55x and 55y are provided similarly to the arrangement in FIG. 8, whereas heads 1w and 1z and associated magnets 62w and 62z are provided similarly to the arrangement of FIG. 9 to detect the positions of support 71 in the directions W—W and Z—Z. The heads 1x, 1y, 1w and 1z are connected with respective detecting circuits 22x, 22y, 22w and 22z, and the output voltages of such detecting circuits are fed back to control circuits 74 which, at any time in the program, compare the output voltages from circuits 22x, 22y, 22w and 22z with voltages from memory unit 72 and, in the event of deviations therebetween, send control signals to one or more of the actuators 73x, 73y, 73w and 73z for displacing support 71 to the position corresponding to that represented by the signal voltages received from memory 72. Thus, support 71 can be moved automatically in accordance with the predetermined program. Of course, the memory 72 can be replaced by suitable manually actuated devices for providing the signal voltages to be compared in circuit 74 with the output voltages of the detecting circuits 22x, 22y, 22w and 22z, in which case the movements of support 71 can be controlled manually from a remote station.

Although illustrative embodiments of the invention have been described in detail herein with reference to the drawings, it is apparent that the invention is not limited to those precise embodiments, and that various changes and modifications may be effected therein by one skilled in the art without departing from the scope or spirit of the invention.

What is claimed is:

1. A device for detecting relative displacement of two members in first and second directions lying in right-angularly related planes, comprising first and second dual-gap magnetic flux responsive heads fixed relative to one of said members with the directions across the gaps of said first and second heads being parallel to said first and second directions, respectively, of the relative displacement, each of said dual-gap magnetic flux responsive heads including a saturable magnetic core and two coils on said core to induce magnetic fluxes in said core in opposed directions in response to current flows through the respective coils in opposed directions, first and second magnets fixed relative to the other of said members and being disposed adjacent said first and second heads, respectively, each of said magnets being magnetized in said direction across the gaps of the adjacent head so that direct magnetic flux is established in said core of said first head from said first magnet in response to relative displacement in said one direction from a datum position and magnetic flux is established in said core of said second head from said second magnet in response to relative displacement in said second direction from said datum position, and circuit means connected with said heads to provide respective output voltages which correspond in magnitude and polarity to relative displacement of said members in said first and second directions from said datum position, said circuit means including, for each of said heads, a source of alternating current, means connecting said two coils to said source and permitting current flows through said coils in opposed directions, two capacitors connected with said two coils, respectively, to be charged to levels corresponding to the current flows through the respective coils, the presence of direct magnetic flux in said core from the respective magnet serving to change the relative inductances of said two coils and thereby causing said two capacitors to be charged to different levels, and output terminal means connected with said capacitors to display an output voltage in response to different charge levels on said capacitors.

2. A device according to claim 1, in which each of said magnets is of substantial length and said direction of magnetization of each magnet is transverse to said length thereof so that the magnetic fluxes received by said first and second heads are uninfluenced by relative displacement of said members in said second and first directions, respectively.

3. A device according to claim 2, in which said first and second directions of relative displacement also lie in a common plane perpendicular to said first and second planes.

4. A device according to claim 2, in which said members have a universal pivotal connection therebetween so that said first and second directions of relative displacement are with respect to first and second, right-angularly related axes, and in which said first and second magnets are longitudinally arcuate and have curvatures respectively centered at said second and first axes.

5. A device according to claim 2, in which said first direction of relative displacement is rotary about an axis and said second direction of relative displacement is in the direction of said axis, and said second magnet is longitudinally arcuate and has its curvature centered at said axis.

* * * * *